(12) United States Patent
Bhatnagar et al.

(10) Patent No.: US 11,625,507 B2
(45) Date of Patent: Apr. 11, 2023

(54) FABRIC SOFTNESS DESIGN AND CONSTRUCTION METHOD

(71) Applicant: Target Brands, Inc., Minneapolis, MN (US)

(72) Inventors: Avinash Bhatnagar, Apple Valley, MN (US); Deanna Brinza, Wayzata, MN (US); Lalit Toshniwal, Richfield, MN (US); Shawna M. Tormondsen, Lakeville, MN (US)

(73) Assignee: Target Brands, Inc., Minneapolis, MN (US)

( * ) Notice: Subject to any disclaimer, the term of this patent is extended or adjusted under 35 U.S.C. 154(b) by 60 days.

(21) Appl. No.: 17/338,939

(22) Filed: Jun. 4, 2021

(65) Prior Publication Data

US 2022/0391547 A1 Dec. 8, 2022

(51) Int. Cl.
*G06F 30/10* (2020.01)
*G06F 113/12* (2020.01)
*D04B 15/66* (2006.01)

(52) U.S. Cl.
CPC .............. *G06F 30/10* (2020.01); *D04B 15/66* (2013.01); *G06F 2113/12* (2020.01)

(58) Field of Classification Search
CPC ...... G06F 30/10; G06F 2113/12; G06F 30/00; G06F 30/17; G06F 30/18; D04B 15/66
See application file for complete search history.

(56) References Cited

U.S. PATENT DOCUMENTS

2020/0077728 A1* 3/2020 Gerson .................. G06Q 50/04

OTHER PUBLICATIONS

SDL Atlas Textile Testing Solutions "FTT Fabric Touch Tester" (Year: 2018).*
Yan Hong et al. "Development of a new knowledge-based fabric recommendation system by integrating the collaborative design process and multi-criteria decision" Textile Research Journal 2018, vol. 88(23) 2682-2698 (Year: 2017).*
Binti Haji Musa A et al. "Practical Considerations of the FTT Device for Fabric Comfort Evaluation" J Fashion Technol Textile Eng 2018, S4 DOI: 10.4172/2329-9568.S4-003 (Year: 2018).*
Ab-Rous et al., A new physical method to assess handle properties of fabrics made from wood-based fibers, IOP Conference Serial: Material Science and Engineering, vol. 254, 7 pages, 2017.
Dent et al., An analysis of fabric 'hand' and 'feel', International Nonwovens Journal, 11 pages, 2002.

(Continued)

*Primary Examiner* — Rehana Perveen
*Assistant Examiner* — Troy A Maust
(74) *Attorney, Agent, or Firm* — Amanda M. Prose; Westman, Champlin & Koehler, P.A.

(57) ABSTRACT

A process for digitally developing a new fabric and for developing a new fabric based on a physical property of the fabric and rather than a fabric construction. The process comprises selecting a desired physical property of the new fabric and selecting a fabric type. The process also includes using a fabric construction calculator to develop fabric construction parameters for the fabric, wherein the fabric has the desired physical property selected. The desired physical property is a selected softness factor of the fabric.

11 Claims, 1 Drawing Sheet

(56) References Cited

OTHER PUBLICATIONS

Kawabata et al., Object hand measurement of nonwoven fabrics: Part I: Development of the equations, Textile Research Journal, Abstract Only, 4 pages, 1994.

Peykamian et al., Fabric softness classification using linear and nonlinear models, Textile Research Journal, Abstract Only, 1 pages, 2000.

Sztandera et al., Identification of the most significant comfort factors for textiles from processing mechanical, handfeel, fabric construction, and perceived tactile comfort data, Textile Research Journal, 12 pages, 2012.

* cited by examiner

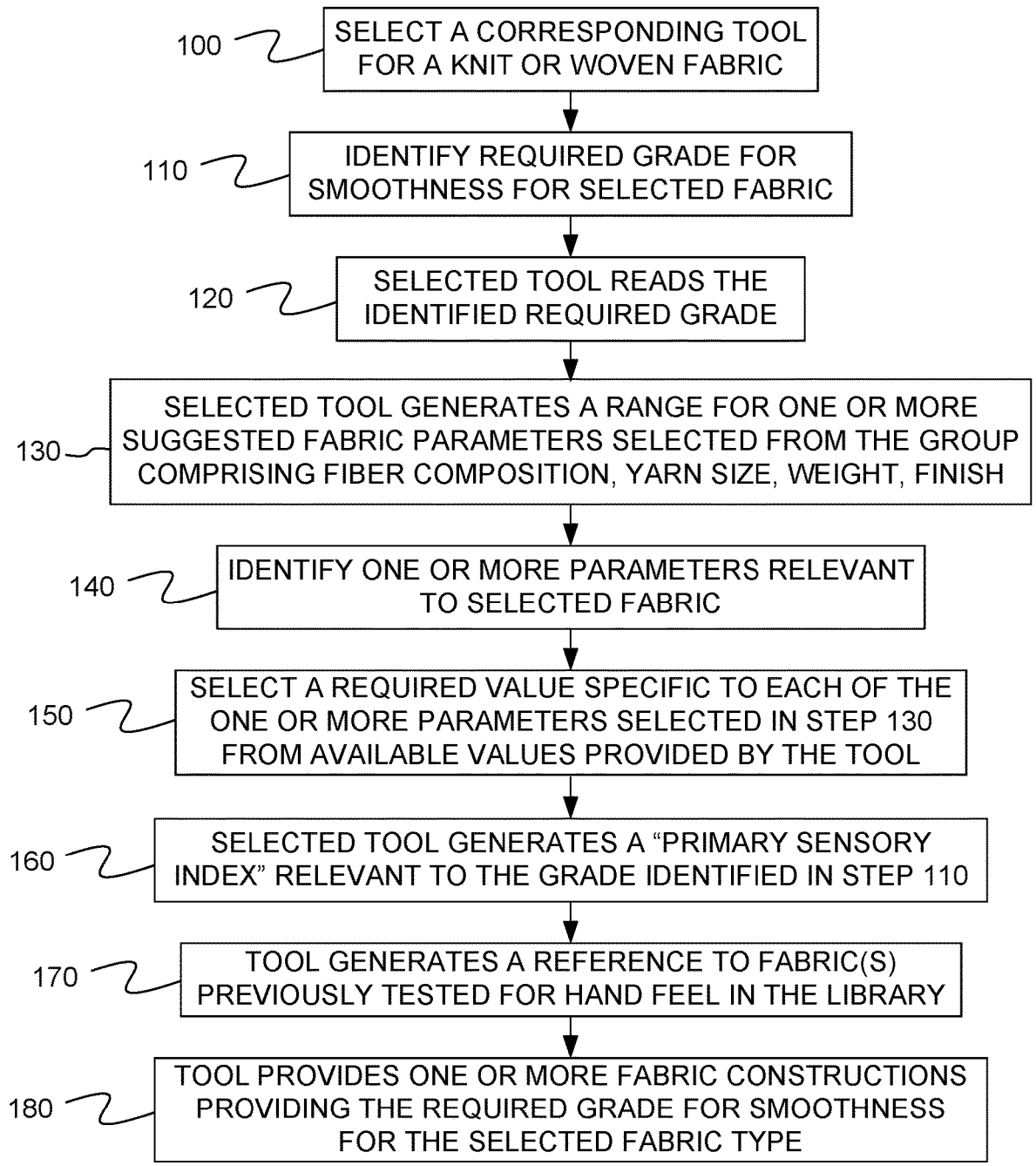

FABRIC SOFTNESS DESIGN AND
CONSTRUCTION METHOD

BACKGROUND

Fabric "hand" is a quality of a fabric that is assessed by the reaction obtained from the sense of a person's touch. Fabric hand is determined by the person's estimation of texture when feeling fabrics between their fingers and thumb. Determining fabric hand is subjective as it is a combination of physical, physiological, and psychological factors.

The subjective nature of determining fabric hand makes it difficult for a manufacturer to meet a customer's request for fabric development where the fabric to be produced is described in part by the hand or "hand-feel" of the fabric. Alternatively, it can be difficult to design a fabric based on a fabric type and/or yarn type, without knowing how soft or smooth that fabric will be and if that softness or smoothness is desired for the end use of the fabric.

Various physical properties of a fabric can be measured with a newer machine referred to as a Fabric Touch Tester (FTT). The properties include bending, friction, roughness, compression, and thermal conductivity of the fabric sample. Based on these values, primary hand feel indices such as smoothness and softness can be generally predicted. However, at present, a correlation between human touch evaluations of a fabric sample and a set of FTT measurements lack a standard. Instead, weak correlations can be made when the comparison is limited to well defined and known fabric constructions for a specific fabric end use. It is also well known that human hand feel perception is a sophisticated phenomenon where physical forces play only a partial role.

A general understanding of softness is usually based on the fabric components and fabric construction in general such as yarn type, weight, whether the fabric is woven or knit, and the fabric finish. Matching FTT measured values to human data is known to have low match rates (for example, for t-shirt softness one study estimated up to 45% misclassification). When developing a fabric for an end use, there is no standard method for developing the fabric and having the fabric manufactured actually match a desired hand feel. The current process is one based on trial and error, by requesting samples from a manufacturer, testing them, and returning the samples to try again. The current process is time intensive and expensive to find a match between manufacturer and customer. The process is essentially one of (multiple)-trial and error.

The discussion above is merely provided for general background information and is not intended to be used as an aid in determining the scope of the claimed subject matter. The claimed subject matter is not limited to implementations that solve any or all disadvantages noted in the background.

SUMMARY

An aspect of the present disclosure relates to developing a new fabric based on a pre-selected softness factor of the fabric. A softness factor is selected, wherein the softness factor correlates to a softness of the fabric determined by a hand feel of the fabric. A fabric construction calculation is then used to provide a fabric construction where the fabric has a softness factor that substantially matches the selected softness factor. The fabric construction calculation outputs a fabric construction data set including a fabric type such as woven or knit, fabric subtype, yarn, weight, finish in sufficient detail to allow a manufacturer to produce the fabric having substantially the same softness factor as the selected softness factor.

Once the fabric construction data is determined by use of the fabric construction calculator, the fabric is manufactured, and its softness factor confirmed by way of physical testing of properties of the fabric using a device such as a Fabric Touch Tester.

Another aspect of the present disclosure relates to a digital research and development process for fabric development, hand evaluation and three-dimensional rendering of a garment from the fabric. The process includes identifying a fabric for development and use in constructing the garment; identifying a selected softness grade for the fabric; selecting one or more fabric construction parameters for the fabric, the parameters selected from the group comprising fabric type, yarn type, method of interlacing, weight, yarn size, cover factor, and fabric finish; and digitally evaluating the fabric according to the one or more fabric construction parameters selected for an associated hand feel. The process then includes adjusting one or more of the selected fabric construction parameters until the digitally evaluated hand feel falls into a same selected softness grade for the identified fabric. One the fabric construction is determined, the process can include creating a three-dimensional rendering of the garment using one or more testable fabric parameters corresponding to the one or more fabric construction parameters.

The one or more testable fabric parameters are selected from bending, friction, roughness, compression and thermal conductivity.

The testable fabric construction parameters are obtained by testing with a Fabric Touch Tester.

In one or more embodiments described herein, the fabric is knit fabric and the softness grade is selected from one of the following grades: Grade 1: wherein the softness is assigned a value of greater 8.00; Grade 2: wherein the softness is assigned a value in the range of greater than 7.00 but less than or equal to 8.00; Grade 3: wherein the softness is assigned a value in the range of greater than 6.50 but less than or equal to 7.00; Grade 4: wherein the softness is assigned a value in the range of greater than 6.00 but less than or equal to 6.50; Grade 5: wherein the softness is assigned a value in the range of greater than 5.50 but less than or equal to 6.00; Grade 6: wherein the softness is assigned a value in the range of greater than 5.00 but less than or equal to 5.50; and Grade 7: wherein the softness is assigned a value of less than 5.00. The softness grade values are outputs confirmed by testing with a Fabric Touch Tester.

In one or more embodiments described herein, the fabric is a woven fabric and the softness grade is selected from one of the following: Grade 1: wherein the softness is assigned a value of greater 16.00; Grade 2: wherein the softness is assigned a value in the range of greater than 14.00 but less than or equal to 16.00; Grade 3: wherein the softness is assigned a value in the range of greater than 12.00 but less than or equal to 14.00; Grade 4: wherein the softness is assigned a value in the range of greater than 10.00 but less than or equal to 12.00; Grade 5: wherein the softness is assigned a value in the range of greater than 8.00 but less than or equal to 10.00; Grade 6: wherein the softness is assigned a value in the range of greater than 6.00 but less than or equal to 8.00; and Grade 7: wherein the softness is assigned a value of less than 6.00. The softness grade values are outputs confirmed by testing with a Fabric Touch Tester.

Yet another aspect of the present disclosure relates to a computer implemented method including selecting a tool corresponding to one of a knit fabric or a woven fabric and identifying a required smoothness grade for the selected fabric type. The method further includes receiving one or more tool generated ranges for one or more suggested fabric parameters; selecting one or more fabric parameters and selecting a value corresponding to the one or more fabric parameters from one or more values received from the tool; and receiving a primary sensory index relevant to the identified smoothness grade.

In one more embodiments, the fabric parameters are fiber composition, yarn size, weight, finish or combinations thereof.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a flow diagram of a method of reverse engineering a fabric construction from a selected smoothness grade.

DETAILED DESCRIPTION

The methods described herein relate to reverse engineering of a fabric. A new fabric can be developed based on identification of one or more physical properties of the fabric itself and/or a garment, or another end use of that fabric. A physical property of the fabric such as softness, smoothness, or a combination of both softness and smoothness can be the starting point for developing the fabric. A customer selects a desired softness or smoothness (or both) and may further identify a selected type of fabric such as a knit or woven fabric. Utilizing a digital calculator of sorts as described herein further below, a fabric construction can be determined, where the resulting fabric accurately possess the softness and/or smoothness selected. Rather than providing a manufacturer with a fabric construction and a general hand feel softness description wherein the manufacturer then uses trial and error to tweak the fabric construction to match the manufacturer's assessment of hand feel, a customer can design a new fabric digitally and eliminate the waste and cost associated with the back-and-forth exchange of fabric samples in the trial-and-error prior art methods.

The softness factor is a range of values that correspond directly to a softness of the fabric otherwise determined by a hand feel of the fabric. Methods described herein weigh one or more fabric construction characteristics and the associated effect of that characteristic on the softness of a fabric manufactured according to those characteristics to provide one or more fabric constructions that satisfy the pre-selected softness requirement. The fabric construction calculator outputs a fabric construction including one or more of a fabric type, fabric subtype, yarn type and size, weight, and/or finish in sufficient detail to allow a manufacturer to produce the fabric having substantially the same softness factor as the selected softness factor.

The methods described herein improve the process for sourcing and/or developing a new fabric for a known end use, such as in the manufacture of a garment. The methods described herein eliminate the trial-and-error steps of developing a fabric based on a ranked hand feel softness and/or smoothness in addition to a basic description of the fabric by type and yarn content. Rather than a customer requesting a fabric based on a hand feel description of the fabric that the manufacturer tries to match based on their own hand feel tests, the fabric is developed based in part on a replicable softness scale. The softness by hand feel is quantified, allowing a customer to digitally develop a fabric with a manufacturer and thus increasing the efficiency and accuracy of fabric development without trial and error.

The methods described herein also provide for standardized consistency among fabrics of the same type, from different manufacturers, and increase confidence when developing or requesting a fabric that the fabric delivered will be the fabric expected. The benefits are especially realized in the development of new fabrics where neither the manufacturer or the customer have the fabric, or a comparable fabric in a fabric library, or wherein the two parties do not have access to the same fabric library as is generally the case where the fabric is manufactured in a different region than the location of the customer.

The methods described herein also eliminate heavy reliance on human hand feel tests conducted by both the customer and the manufacturer and eliminates the blind requirement that these tests conducted at different locations, with different people, should match. Instead, a customer may request a fabric construction and indicate that the fabric have a hand feel of, for example, a softness grade and/or a smoothness grade of Grade 1 to 7, and the manufacturer will be able to develop the fabric having a match in hand feel in the fabric.

In the prior art, the hand feel of a fabric per a grade or group is determined by ranking the feel of multiple samples of the fabric. The fabric samples are produced and construction is tweaked. Then humans are made to rank the samples from softest to least soft. No such step is required when using the digital process for fabric development and methods provided for herein.

Confirmation of the selected softness and/or smoothness factors can be made using a Fabric Touch Tester of the type manufactured and sold by SDL Atlas under the FTT® name. The Fabric Touch Tester is a machine used to predict sensations of a fabric including a "hand feel" where the tester measures thickness, compression, bending, roughness, friction, and thermal properties of a fabric sample. That is, after the customer has selected a softness or smoothness and the fabric construction corresponding thereto is selected, the manufacturer can confirm that the fabric is manufactured to the customers specification by conducting testing on the fabric with a Fabric Touch Tester before sending to fabric to the customer, ensuring efficiency and accuracy in fabric development.

To develop the softness grade for each type of fabric (e.g., woven or knit) for the methods described herein, numerous samples of fabric were subject to Fabric Touch Tester testing and the properties recorded by specific fabric construction for confirmation of softness and smoothness.

As described throughout this disclosure, the methods herein relate to reverse development and engineering of a fabric starting from a selected softness grade and smoothness grade. However, any testable property of the fabric including, but not limited to, bending, roughness, friction, or thermal properties could provide a starting selected value for subsequently determining an appropriate fabric construction which substantially matches the starting selected value.

Using the methods described herein, a supplier can provide a fabric or textile having a selected parameter (e.g., softness, smoothness, and/or bending, roughness, thermal properties) that matches the parameter(s) requested by a customer based on the providing of accurate Fabric Touch Tester data correlating to the parameters, fabric construction, or a combination thereof. This standardization allows the customer and the manufacturer or supplier to test samples in the same manner and the manufacturer to construct a fabric meeting the selected parameters. The customer may also provide specifications for a fabric with accuracy as relates to hand feel.

It is also contemplated and within the scope of this disclosure that a fabric may be requested from a manufacture or supplier based on a description using one or more Fabric Touch Tester data points to dictate construction (e.g., yarn, weight, etc.).

Table 1 below illustrates the value ranges which correspond to a softness factor and a smoothness factor of a sample fabric. The FTT Grades 1-7 correspond to ranked softness wherein the numeric value is a measured value for softness or smoothness, where the measured value is obtained or confirmed by way of testing a sample with a Fabric Touch Tester or similar machine or test process according to Fabric Touch Tester manufacturer specifications for testing samples. The Grades are used to digitally develop a fabric and a user can select a desired softness grade, a desired smoothness grade, or a combination thereof for a knit or woven fabric and can then develop fabric construction specifications which produce a fabric having a hand feel softness or smoothness substantially matching that of the selected desired softness grade, smoothness grade or both.

A Grade 1 fabric is the softest fabric, whereas a Grade 7 fabric is a stiffer and more harsh, non-soft fabric. The Grade corresponds directed to a Fabric Touch Tester average softness measurement.

TABLE 1

| FTT Grade | Knit Fabric | Woven Fabric |
|---|---|---|
| 1 | >8.00 | >16.00 |
| 2 | 7.00-7.50 | 14.00-16.00 |
| 3 | 6.50-7.00 | 12.00-14.00 |
| 4 | 6.00-6.50 | 10.00-12.00 |
| 5 | 5.50-6.00 | 8.00-10.00 |
| 6 | 5.00-5.50 | 6.00-8.00 |
| 7 | <5.00 | <6.00 |

In designing a fabric according to a pre-selected softness grade, including a pre-selected hand feel for softness, the method comprises first selecting a softness grade for the fabric. The fabric type is then selected from, for example, a knit or a woven fabric.

Fabric subtypes, fabric weights (oz./sq. yd., GSM) fabric type, yarn weight, stitch length for knit materials, and finish are all fabric construction characteristics accounted for in the engineering and/or design of the fabric having the pre-selected softness factor by grade.

For a woven fabric, additional fabric construction characteristics accounted for in the methods described herein include one or more of a fabric subtype depending on for example, a garment to be constructed from the fabric. Such subtypes can include but are not limited to twills (e.g., 2/4 twill, 3/1 twill, 2/2 twill), herringbones, challis, oxford, poplin and/or crepe. The fiber type such as cotton, rayon, spandex or blends thereof is also accounted for. Additionally, a finish of the fabric also is accounted for in engineering the fabric to match the pre-selected softness factor and softness grade. Finishes accounted for include but are not limited to peaching, mild peaching, brushing, flannel, brush face, mechanical stretch and tech fabric.

For a knit fabric, additional fabric construction characteristics accounted for in the methods described herein include one or more of a fabric subtype depending on for example, a garment to be constructed from the fabric. Such subtypes can include but are not limited to jersey, jersey snow, French terry, thermal, thermal snow, ribbed knits such as 11Rib or 22Rib and variegated rib or the like. The fiber type such as cotton, rayon, polyester, modal, spandex or various blends thereof is also accounted for. Additionally, a finish of the fabric also is accounted for in engineering the fabric to match the pre-selected softness factor and softness grade. Finishes accounted for include but are not limited to biopolishing, tough cotton, reactive printed, pig printing or yarn died.

The following findings guide the determination of a fabric construction based on the selected softness or smoothness grade. Smoothness is found to be directly proportional to an increase in the weight of the fabric, while the smoothness factor progressively increases with the fabric weight up to a fabric weight of about 200 gsm. Above 200 gsm, the smoothness factor decreases in an inversely proportional manner for fabrics of the same yarn count at that weight. Additional considerations affecting the smoothness factor include the yarn size. As the yarn size becomes finer, the smoothness factor increases.

It is also found that the inclusion of Spandex in the fabric, to an extent of 5% of the fabric, reduces the smoothness to the extent of 25% regressively based on the weight and yarn size.

Interestingly, it is also found that the softness of the fabric behaves inversely with respect to the smoothness of the fabric. Softness also further reduces with an increase in the thickness of the fabric as associated with the yarn size.

Bio-polishing or peaching processes help to improve and increase both the smoothness factor and softness factor of the fabric, up to the extent of 25% for standard bio-polishing and mild peaching. However, bio-polishing or peaching beyond 25% of the fabric reduces the smoothness and softness beyond due to excessive cutting of the fiber at the surface of the fabric occurring with these processes.

Woven Fabrics

Woven fabrics are those formed by weaving threads of a material. Woven fabrics generally comprise multiple strands of a material crossing each other at right angles to form a grain. With respect to woven fabrics, a total of twenty-four (24) fabrics with different fibers, yarn size, and/or structure were tested for developing a standard for guiding hand feel softness determinations and grades according to hand feel rankings. Such data is useful in the digital development of fabrics and garments made thereof and illustrates the effectiveness of the methods of determining a fabric construction from a selected softness or smoothness grade (Grade 1-7) confirmed by FTT testing.

In comparing woven fabrics with similar fibers and weaves it was found that the determination of smoothness by hand feel for developing a fabric is directly proportional to a cover factor of the fabric. As the cover factor of the fabric increases, the smoothness factor increases. However, the softness factor was found to be inversely proportional to cover factor of the fabric. With the increase in cover factor, the softness factor of the fabric reduces. What is meant by the term "cover factor" as relates to woven fabrics is the scientific measurement of the percentage area of the fabric covered by the yarns and fiber and can be expressed as an amount of light that passes through the gaps in the woven fabric.

The smoothness factor is also impacted by the size of the yarn and the count. For example, the softness factor is directly proportional to the Ne yarn size. As the yarn size increases beyond 32' Ne, the hand smoothness factor increases as well.

Mild peaching in a fabric impacts the smoothness and softness factor more adversely than medium peaching. Fabrics with medium peaching are found to be softer and smoother than mild or soft peached fabrics due to the fact that fibers are more evenly cut in a second passage of peaching for mild peaching. However, additional passes for peaching result in too many fabric cuts at the surface such that the softness and smoothness factors begin to decrease with heavier peaching. Heavy peaching or brushing of the fabric reduces the smoothness and softness factors to the highest extent, and without being bound by theory it is believed this is due to the deep cutting of fibers for heavy peaching or brushing which give the fabric a flannel effect.

It was also found that weaves with more intersections, such as a plain weave like Poplin are softer and smoother when compared to twills or crepe. It was also found that regenerated cellulosic fibers like Rayon feel softer than cotton.

Woven Fabric—Example 1

Table 2 below is an example of the calculation for a reverse engineering of a woven fabric, where the fabric construction is developed or determined based on a desired hand feel or softness grade. In the table below, the softness grade ("GRADE") is the desired, pre-selected softness grade of the fabric and the GRADE DATA is the predicted softness of the actual constructed fabric, which is confirmed by way of subjecting the sample to a Fabric Touch Tester (FTT) after manufacture according to the corresponding fabric construction specification or "Description of Required Fabric".

softness determinations and grades according to hand feel rankings. Such data is useful in digital development of fabrics and garments made thereof.

In testing various samples, it was found that for knit fabrics of various fibers, yarn size and structures, an actual smoothness and actual softness factor are each proportional to the stitch length of the fabric. For example, as the stitch length of the fabric increases so too does the smoothness and softness factor. What is meant by "stitch length" as used herein with respect to the knit fabrics is the length of yarn knitted into one stitch in a weft knitted fabric. Thus, as the stich length of the fabric construction increases, so too does the softness and smoothness of the fabric.

It was also discovered that bio-polishing positively impacts the smoothness and softness factor of the fabric. Bio-polishing is a process of using cellulases for modifying the surface of the fabric to reduce pilling of the fabric. Bio-polishing reduces superficial microfibrils of cotton fibers, for example.

Fabrics with spandex in all fiber blends but while retaining similar stitch length have a reduction in the smoothness and softness factors.

Murata Vortex Spinning (MVS) processes improve softness and smoothness factors when compared to yarns spun by ring spinning.

Additional fabric construction considerations in knit fabric structures such as rib knit fabric have shown increased softness and smoothness factors. Fabrics such as French terry knit have lower smoothness and softness factors when compared to Jersey fabrics.

It was also found that regenerated cellulosic fibers such as rayon have a softer hand feel and thus higher softness factor than 100% cotton.

A smoothness grade and a softness grade can be calculated for a proposed fabric construction with accuracy such that a fabric can be digitally developed to match a predetermined hand feel softness without the trial-and-error steps of manufacturing various fabric samples or swatches

| SUBTYPE | WEIGHT | FIBER | YARN | FINISH | INTENT |
|---|---|---|---|---|---|
| 21T | 6.00 | COTSP | 3221 | PEACH | |

| DESCRIPTION OF REQUIRED FABRIC | TEST | PARAMETER | GRADE | GRADE DATA +/−5% | FAB REFERENCE |
|---|---|---|---|---|---|
| 21T5.00COT30MPEACH | SMOOTH | HAND | G4 | 10.9709755 | 00L6 |
| | SMOOTH | TOUCH | G4 | 11.81854271 | 00L6 |
| | SOFT | HAND | G6 | 6.418487046 | 00L6 |
| | SOFT | TOUCH | G6 | 6.947607269 | 00L6 |

This method can be used in the initial development of the fabric, before the fabric is added to a fabric library. Generating the smoothness and softness grade of the fabric, at least in part from the specification of the fabric, allows for reproduction of the fabric based on schematics wherein a customer knows what fabric softness grade they are to expect before feeling the fabric.

Knit Fabrics

A knit fabric is generally made of a single yarn looped continuously or otherwise knit to form a braid for forming into a fabric. A total of thirty-nine (39) fabrics with different fibers, yarn size, and/or structure were tested for and structure were tested to develop a standard for guiding hand feel and having said samples or swatches tested by human hands of the manufacturer and the customer.

Knit Fabric—Example 2

Table 3 below is an example of the calculation for a reverse engineering of a knit fabric, that is, developing a fabric based on a desired hand feel or softness and smoothness factor. In the table below, the softness grade ("GRADE") is the desired, pre-selected softness grade of the fabric and the GRADE DATA is the predicted softness of the actual constructed fabric, which is confirmed by way of subjecting the sample to a Fabric Touch Tester (FTT) after manufacture according to the corresponding fabric construction specification or "Description of Required Fabric".

| SUBTYPE | WEIGHT | FIBER | YARN | FINISH | INTENT |
|---|---|---|---|---|---|
| JER | 160 | COT | 30 | BIO | |

| DESCRIPTION OF REQUIRED FABRIC | TEST | PARAMETER | GRADE | GRADE DATA +/−5% | FAB REFERENCE |
|---|---|---|---|---|---|
| JER160COT30BIO | SMOOTH | HAND | G2 | 7.35 | K812 |
| | SMOOTH | TOUCH | G2 | 6.82 | K812 |
| | SOFT | HAND | G3 | 7.03 | K812 |
| | SOFT | TOUCH | G3 | 5.86 | K812 |

A method of digitally developing a fabric can include evaluating or assigning a hand feel grade to the fabric. The hand feel of the fabric can additionally be evaluated by finding a similar fabric in a Fabric Library. The Fabric Library may be a library maintained by the customer, the manufacturer, or another and comprises fabrics that have been used in past products, as well as fabrics that are currently being used. The Fabric Library also comprises information about the fabric construction including the fibers in the fabric.

The Examples discussed above utilize a Reverse Engineering Tool for fabric construction according to the method of FIG. 1. First, a corresponding Tool for a knit or woven fabric is selected at step 100. The user identifies a required Grade for smoothness and inputs such Grade into the tool at step 110. The selected tool reads the identified required grade at step 120 and further generates a range for one or more suggested fabric parameters at step 130. These parameters are selected from those described herein including but not limited to fiber composition, yarn size, weight, and finish. One or more parameters relevant to the selected fabric are identified at step 140. Required values specific to each of the one or more parameters selected in step 130 from available values provided by the Tool at step 150. The selected tool generates a "Primary Sensory Index" relevant to the Grade identified in step 110 at step 160. The tool may also read a reference library and generate a reference to fabric(s) previously tested for hand feel and which match a selected Grade, fabric and one or more relevant parameters at step 170. The tool provides one or more fabric constructions providing the required Grade for Smoothness for the selected fabric type at step 180.

The Primary Sensory index (PSI) generated at step 160 is a theoretical measurement developed for a quality control ("QC") check for batch to batch comparison. To capture this data, a human hand panel was constructed where samples ranging from lightweight lace to heavy denim work wear were compared to a "control" sample of cotton sheeting. In each case, participants provided an indication of whether the sample is "Smoother than/Less Smooth", "Softer than/Less Soft", and "Warmer than/Cooler than", the control sample. Each sample was also subject to Fabric Touch Testing (FTT) to capture FTT data for the indices above, which were further correlated to the human hand panel data.

After the full series of tests were run, the data from the human hand panel and the FTT were run into SAS software to determine the importance of each index with respect to the Primary Sensory Indices "Smoothness", "Softness" and "Warmth", and a calculation for the wide range of materials was developed.

The PSI "Library" as it comes with FTT test machines is a "proof of concept" and spans a wide range of materials. For example, in a real-life setting, a lace material would never be compared to or comparable to a denim, as the fabrics are simply put, too different.

The methods described herein are digital fabric development methods which also avoid the shipping of a fabric for physical review and approval. This elimination of the trial-and-error steps not only reduces the costs associated with shipping fabrics around the world between manufacturers and customers and reduces a carbon foot-print associated with the fabric development. This also reduces the waste, water and energy consumption associated with fabric development.

Physical methods for testing a softness of a textile and human hand assessments (e.g., hand-feel) mostly agree on what textiles are "softest," for example, there lacks consensus in rankings as well as ranges of what is "smooth" with both the physical methods and hand-feel test. While these methods do use Fabric Touch Tester testing to provide a physical test for softness, what the methods described herein accomplish allow a user to describe a fabric via Fabric Touch Tester testing targets and fabric construction to produce a textile having a predetermined softness. This is in contrast to the prior art methods of textile sourcing which includes a hand-feel indication of "soft" or "softest" or "less soft" for example. That is, the subject element requiring trial and error is removed from textile sourcing via the methods described here.

For example, a woven textile for an apparel end use is desired and its hand-feel softness is selected by the customer. The hand-feel test is a subjective test depending on the perception of the owner of the hand. While most people can agree on a general identifier that a textile is "rough" or "semi-soft" or "very soft", these terms are vague and inconsistent. This leads to difficulty in sourcing a textile having a selected level of softness for various selected end-uses. The methods described herein remove the subjective element from sourcing such fabrics and instead provides a method, a calculator of sorts, for sourcing a fabric having the softness desired in a manner that allows the manufacturer to meet the customer's request without a trial-and-error process. The methods described here provide the first standard for softness and smoothness of a textile and such standard allows customers to efficiently and accurate construct a textile with a pre-determined desired softness or smoothness.

The tools described herein may be provided in a computer readable medium. A computing device can be used to implement the various parts of method 100. The computing device generally comprises a processing unit or processor, which executes programs to perform the methods described above. The computing device may operate in a network environment utilizing connections to one or more remote computers, such as a server, a router, a peer device, or other common network node.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A process for digitally developing a new fabric, the process comprising:
    selecting a desired physical property of the new fabric wherein the desired physical property is at least one of a softness factor or a smoothness factor of the new fabric;
    selecting a fabric type; and
    using a fabric construction calculator to develop fabric construction parameters for the new fabric in response to the selected desired physical property of the new fabric and the selected fabric type such that the fabric construction calculator outputs the fabric construction parameters that substantially match the desired physical property of the new fabric for the selected fabric type;
    producing the new fabric having the desired physical property selected; and
    incorporating the new fabric and producing a garment or textile,
    wherein using the fabric construction calculator eliminates the physical exchange of fabric samples between a customer and a manufacturer for confirmation of the selected fabric type having the desired physical property of the new fabric.

2. The process of claim 1, wherein the desired physical property is a softness factor of the new fabric.

3. The process of claim 2, wherein the softness factor is identified by selecting a softness grade and wherein the softness grade can be confirmed by way of testing the new fabric with a textile testing machine capable of measuring a sensation of the new fabric.

4. The process of claim 2, wherein the fabric type is woven.

5. The process of claim 2, wherein the fabric type is knit.

6. The process of claim 4, wherein the fabric construction parameters comprise one or more of the following: fabric subtype, weight, yarn type, cover factor, and finishing.

7. The process of claim 5, wherein the fabric construction parameters comprise one or more of the following: fabric subtype, weight, yarn type, stitch length, and finishing.

8. The process of claim 2 and further comprising creating a three-dimensional rendering of a garment from the new fabric.

9. A digital research and development method for fabric development for a garment constructed from the fabric, the method comprising:
    identifying a knit or woven fabric for development and use in constructing the garment;
    identifying a selected softness grade for the fabric;
    selecting one or more fabric construction parameters for the fabric selected from the group comprised of yarn type, method of interlacing, weight, yarn size, cover factor, and fabric finish;
    digitally evaluating the fabric according to the one or more fabric construction parameters selected for an associated hand feel;
    adjusting one or more of the selected fabric construction parameters until the digitally evaluated hand feel falls into a same selected softness grade for the identified fabric;
    creating a three-dimensional rendering of the garment using one or more testable fabric parameters corresponding to the one or more fabric construction parameters;
    identifying the developed fabric based on fabric construction instructions including both the fabric construction parameters and the values required for the one or more testable fabric parameters; and
    producing the garment with the identified fabric having the same identified softness grade.

10. The method of claim 9, wherein the one or more testable fabric parameters are selected from the group comprised of: bending, friction, roughness, compression and thermal conductivity.

11. The method of claim 9, wherein the testable fabric construction parameters are obtained by testing with a textile testing machine capable of measuring a sensation of the fabric.

* * * * *